(12) United States Patent
Paone et al.

(10) Patent No.: US 7,865,859 B2
(45) Date of Patent: Jan. 4, 2011

(54) IMPLEMENTING APS VOLTAGE LEVEL ACTIVATION WITH SECONDARY CHIP IN STACKED-CHIP TECHNOLOGY

(75) Inventors: Phil C. Paone, Rochester, MN (US); David Paul Paulsen, Dodge Center, MN (US); John Edward Sheets, II, Zumbrota, MN (US); Gregory John Uhlmann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 11/869,841

(22) Filed: Oct. 10, 2007

(65) Prior Publication Data

US 2008/0266736 A1    Oct. 30, 2008

Related U.S. Application Data

(63) Continuation-in-part of application No. 11/739,723, filed on Apr. 25, 2007.

(51) Int. Cl.
*G06F 17/50* (2006.01)
(52) U.S. Cl. .................. 716/12; 716/1; 716/6; 716/17
(58) Field of Classification Search .............. 716/1, 716/6, 12, 17
See application file for complete search history.

(56) References Cited

U.S. PATENT DOCUMENTS 6,388,853 B1 *   5/2002   Balakrishnan et al. ..... 361/93.9

OTHER PUBLICATIONS

U.S. Appl. No. 11/016,219, to Anthony Bonaccio, filed Dec. 17, 2004, entitled Using Electrically Programmable Fuses To Hide Architecture, Prevent Reverse Engineering, and Make A Device Inoperable.
U.S. Appl. No. 11/016,220, to Karl Erickson, filed Dec. 17, 2004, entitled Changing Chip Function Based on Fuse States.
"Three-dimensional integrated circuits" by A.W. Topol et al., IMB J. Res. & Dev., vol. 50 No. 4/5, pp. 491-501, Jul./Sep. 2006.

* cited by examiner

*Primary Examiner*—Thuan Do
(74) *Attorney, Agent, or Firm*—Joan Pennington (57) ABSTRACT

A method and apparatus implement adaptive power supply (APS) system voltage level activation eliminating the use of electronic Fuses (eFuses), and a design structure on which the subject circuit resides are provided. A primary chip includes an adaptive power supply (APS). A secondary chip circuit includes at least one pair of hard-wired APS setting connections. Each hard-wired APS setting connection is defined by a selected one of a voltage supply connection and a ground potential connection. A respective inverter couples a control signal from each of the hard-wired APS setting connections to a power communication bus connected to the APS on the primary chip.

11 Claims, 7 Drawing Sheets

| BUS | POWER LEVEL |
|-----|-------------|
| 00  | 0.8-0.9 V   |
| 01  | 0.9-1.0 V   |
| 10  | 1.0-1.1 V   |
| 11  | 1.1 - 1.2 V |

IMPLEMENTING APS VOLTAGE LEVEL ACTIVATION WITH SECONDARY CHIP IN STACKED-CHIP TECHNOLOGY

This application is a continuation-in-part application of Ser. No. 11/739,723 filed on Apr. 25, 2007.

FIELD OF THE INVENTION

The present invention relates generally to the data processing field, and more particularly, relates to a method and apparatus for implementing adaptive power supply (APS) system voltage level activation eliminating the need for using electronic fuses (eFuses), and a design structure on which the subject circuit resides.

DESCRIPTION OF THE RELATED ART

Electronic fuses (eFuses) are one time electrically programmable elements that are written or blown with an external voltage that modifies the fuse resistance, allowing the fuse to retain its local state over time, powering on/off, and the like. Chip security is accomplished by blowing fuses at several stages of the product's design cycle including wafer test, module test, system test, lab use, customer use and returns.

Electronic Fuses (eFuses) are currently used to configure elements after the silicon masking and fabrication process. These fuses typically are used to configure circuits for customization and to correct silicon manufacturing defects and increase manufacturing yield.

However, reliability is a problem with using eFuses, for example, blowing of fuses can damage a portion of the chip. EFuses are blown in differing environments, for example, including temperature, voltage, life cycle, and the like. Containing damage cannot always be guaranteed under all operating conditions.

In blowing the eFuse elements, a particular blow current and typically an elevated voltage are required to accomplish blowing the eFuse. When a given eFuse is selected and blown, the current required to blow the eFuse can be measured at the pin used to deliver the eFuse blow voltage and the existence of an elevated voltage feeding the chip can enable would-be hackers to identify the location of the security on the chip.

Also it is a problem to reliably sense the state of the fuse or determine whether the fuse is blown or is it not. EFuses depend on a change of resistance when blown. This change in resistance can be relatively small and varies for individual fuse. This resistance change requires sensitive sense amplifiers that are becoming increasingly difficult to design and manufacture in shrinking technologies.

Figure 1:
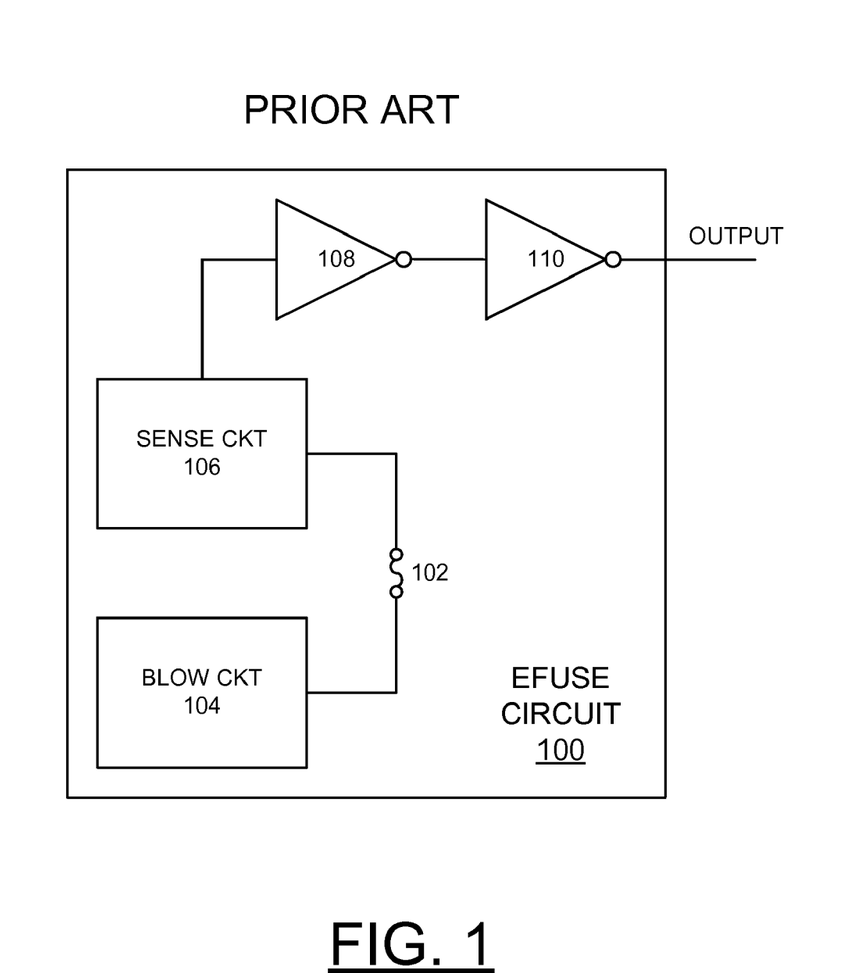
FIG. 1 illustrates a prior art eFuse circuit.

FIG. 1 illustrates a prior art eFuse circuit 100 including an eFuse 102 connected between a blow circuit 104 and a sense circuit 106. A pair of series connected inverters 108, 110 coupled to the sense circuit 106 provides an output of the eFuse circuit 100.

Figure 2:
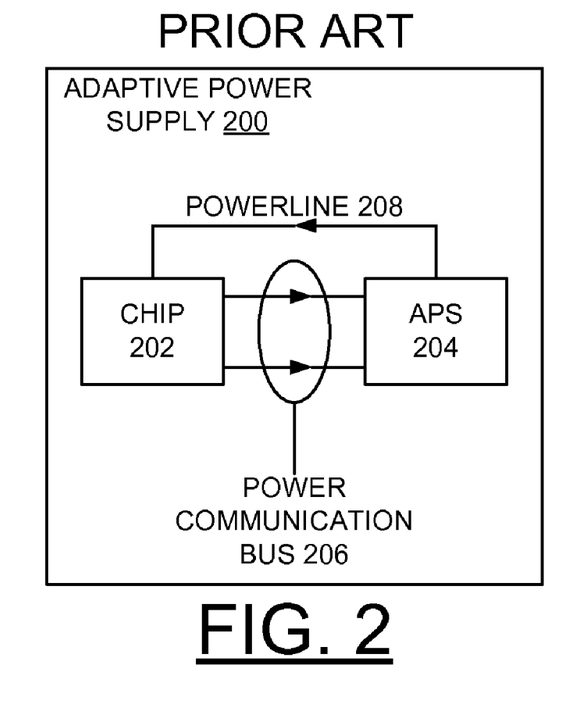
FIG. 2 illustrates a prior art adaptive power supply (APS)

FIG. 2 illustrates a prior art adaptive power supply 200 including a chip 202 coupled to an adaptive power supply (APS) 204. A power communication bus 206 provides control signal to the APS 204 from the chip 202 utilizing, eFuse circuits 100 to select a power level for the chip 202, as indicated at a line labeled POWERLINE 208.

Figure 3:
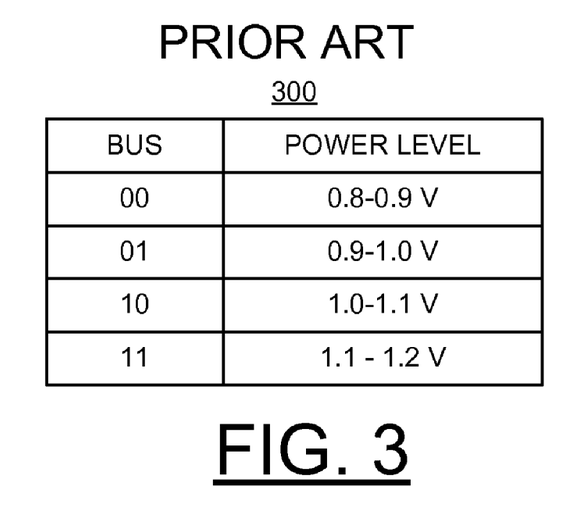
FIG. 3 is a chart illustrating power communication bus control signal values for exemplary system voltages levels of the prior art adaptive power supply (APS) of FIG. 2.

FIG. 3 illustrates exemplary power communication bus control signal values for exemplary system voltages levels of the prior art adaptive power supply (APS) 204 of FIG. 2. With a two-bit control signal input four predefined lowest system levels are selected. As shown with a control signal input of 00, for example, a predefined lowest system level in a range between 0.8 Volts (V) and 0.9 V is provided by the APS 204. As shown with a control signal input of 11, for example, the APS 204 provides a predefined highest system level in a range between 1.1 V and 1.2 V.

Figure 4A:
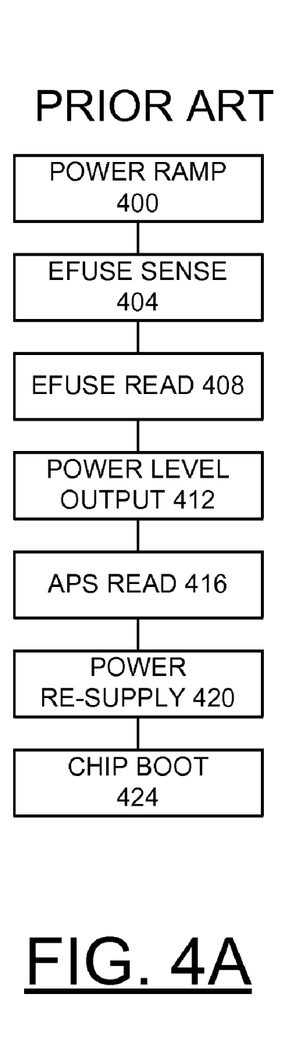
FIGS. 4A and 4B are flow charts illustrating respective prior art eFuse boot steps and exemplary system voltages levels of the prior art adaptive power supply (APS) of FIG. 2.
Figure 4B:
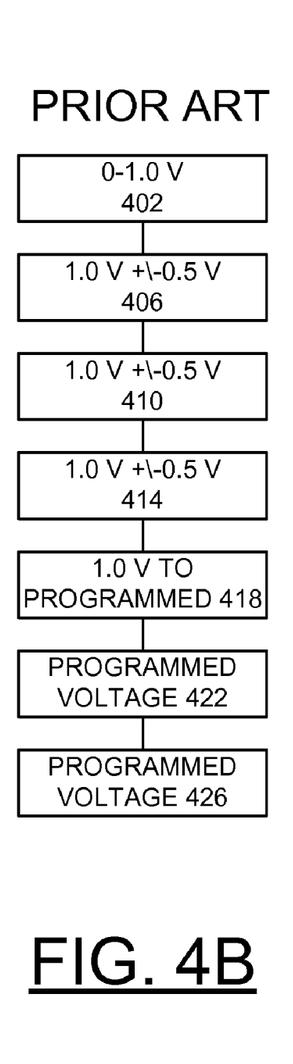

FIGS. 4A and 4B illustrate respective prior art eFuse boot steps and exemplary system voltages levels of the prior art adaptive power supply (APS) 204 of FIG. 2. First as indicated at a block 400, a power ramp step is provided, and the system voltage level of the prior art APS 204 increases from 0.0 V to 1.0 V, as indicated at a block 402. With the power-up at block 400, the voltage must ramp up to where all chips will function; however, this may cause low voltage chips to be discarded that fail to operate at the 1.0 V. An eFuse sense step is performed as indicated at a block 404, and the system voltage level of the prior art APS 204 is provided at about 1.0 V+\-0.5 V, as indicated at a block 406. An eFuse read step is performed as indicated at a block 408, and the system voltage level of the prior art APS 204 is provided at about 1.0 V+\-0.5 V, as indicated at a block 410. Next a power level output is provided as indicated at a block 412, and the system voltage level of the prior art APS 204 is provided at about 1.0 V+\-0.5 V, as indicated at a block 414. An APS read step is performed as indicated at a block 416, and the system voltage level of the prior art APS 204 is provided at about 1.0 V to the particular programmed voltage, as indicated at a block 418. Next a power re-supply step is performed as indicated at a block 420, and the system voltage level of the prior art APS 204 is provided at the particular programmed voltage, as indicated at a block 422. Finally a chip boot step is performed as indicated at a block 424, and the system voltage level of the prior art APS 204 is provided at the particular programmed voltage, as indicated at a block 426.

A need exists for an effective mechanism for implementing system voltage level activation for an adaptive power supply (APS), while eliminating the need for using electronic Fuses (eFuses).

SUMMARY OF THE INVENTION

Principal aspects of the present invention are to provide a method and apparatus for implementing adaptive power supply system voltage level activation eliminating the need for using electronic fuses (eFuses), and a design structure on which the subject circuit resides. Other important aspects of the present invention are to provide such a method and apparatus for implementing adaptive power supply system voltage level activation substantially without negative effect and that overcome many of the disadvantages of prior art arrangements.

In brief, a method and apparatus for implementing adaptive power supply (APS) system voltage level activation eliminating the use of electronic Fuses (eFuses), and a design structure on which the subject circuit resides are provided. A primary chip includes an adaptive power supply (APS). A secondary chip circuit includes at least one pair of hard-wired APS setting connections. Each hard-wired APS setting connection is defined by a selected one of a voltage supply connection and a ground potential connection. A respective inverter couples a control signal from each of the hard-wired APS setting connections to a power communication bus connected to the APS on the primary chip.

In accordance with features of the invention, the secondary chip circuit includes a stacked chip arrangement. The secondary chip advantageously is produced using relatively inexpensive fabrication techniques and older technologies as compared to the primary chip. All eFuses conventionally used for APS system voltage level activation have been eliminated from the design of the primary chip, eliminating the need for blowing and sensing the eFuses. The secondary chip is configured to provide the desired APS system voltage level activation substantially immediately upon boot-up. There is no point during the system boot at which the system will be non-secure.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, using an Adaptive Power Supply (APS) in accordance with the preferred embodiment enables advantages in both power requirements and chip circuit yield. In the prior art APS systems, APS settings must first be read from respective eFuses before APS boot-up. In order to accomplish reading the APS settings from eFuses, a significant portion of the chip must boot-up with a common voltage. With APS settings connected directly to VDD or GND on a secondary chip in accordance with the preferred embodiment the boot process now ramps to VDD until the APS settings are recognized as ones and zeros. Once this has been accomplished the APS voltage is activated to the proper operating voltage.

Figure 5:
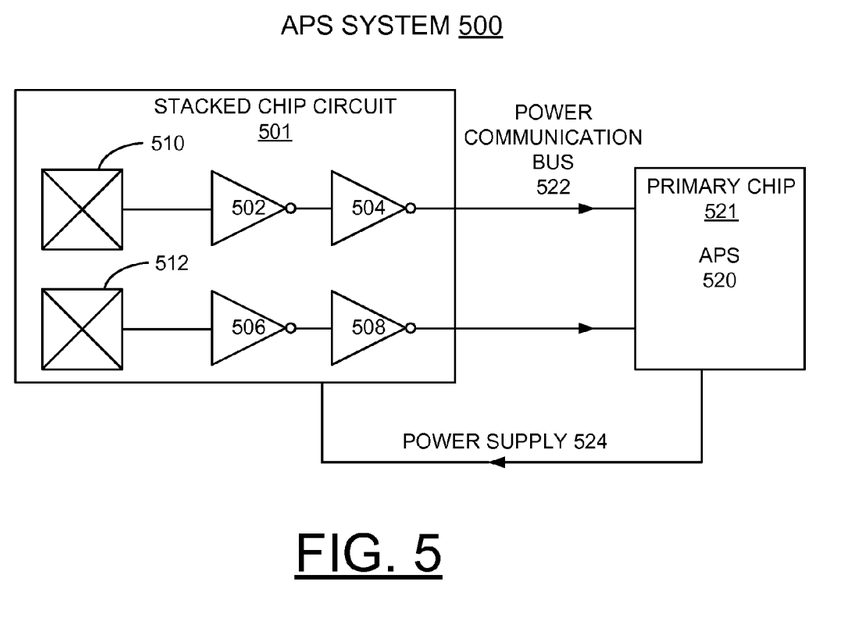
FIG. 5 illustrates an adaptive power supply (APS) in accordance with the preferred embodiment.

Having reference now to the drawings, in FIG. 5, there is shown an adaptive power supply (APS) generally designated by the reference character 500 in accordance with the preferred embodiment. APS system 500 includes a secondary chip stacked chip circuit 501. The secondary chip circuit 501 includes a pair of series connected inverters 502, 504; and 506, 508 respectively connected to one of a pair of hard-wired APS setting connections 510, 512. Each of the hard-wired APS setting connections 510, 512 is defined by a selected one of a voltage supply connection VDD and a ground potential connection. The respective output inverter 504, 508 couples a control signal from each of the hard-wired APS setting connections 510, 512 to an adaptive power supply (APS) 520 provided on a primary chip 521. A power communication bus 522 applies the control signal from each of the hard-wired APS setting connections 510, 512 to the APS 520 on the primary chip. The APS 520 provides a power supply 524 to the secondary chip circuit 501.

In accordance with features of the invention, the secondary chip circuit 500 includes a stacked chip arrangement. The secondary chip circuit 500 advantageously is produced using relatively inexpensive fabrication techniques and older technologies as compared to the primary chip APS 520. All eFuses conventionally used for APS system voltage level activation are eliminated from the design of the primary chip, eliminating the need for blowing and sensing the eFuses. The secondary chip circuit 500 is configured to provide the desired APS system voltage level activation immediately upon boot-up. There is no point during the system boot at which the APS system 520 will be non-secure.

Figure 6A:
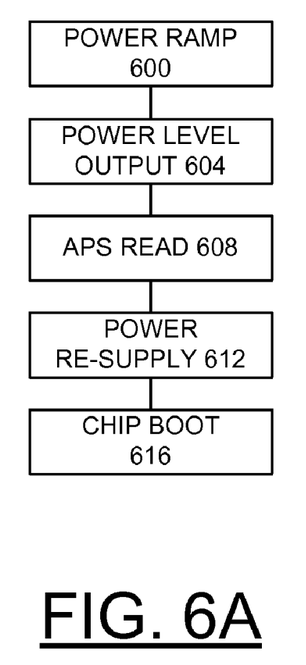
FIGS. 6A and 6B are flow charts illustrating respective exemplary eFuse boot steps and exemplary system voltages levels of the adaptive power supply (APS) of FIG. 5 in accordance with the preferred embodiment.
Figure 6B:
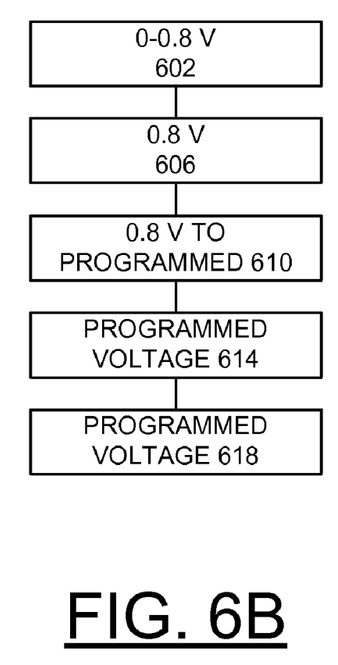

Referring now to FIGS. 6A and 6B, there are shown flow charts illustrating respective APS system boot-up steps and exemplary system voltages levels for the adaptive power supply (APS) system 500 in accordance with the preferred embodiment. The APS boot sequence is performed of each chip to provide a desired APS system voltage level activation for chip. First a power ramp step is provided to a first predetermined system voltage as indicated at a block 600, and the system voltage level of the APS 520 increases, for example, from 0.0 V to 0.8 V, as indicated at a block 602. The first predetermined system voltage advantageously is less than a system voltage level required for sense circuits to function on a conventional chip including eFuses. The inverters 502, 504; and 506, 508 respectively connected to the hard-wired APS setting connections 510, 512 are robust circuits that are functional at the first predetermined system voltage.

A power level output is provided as indicated at a block 604 and the first predetermined system voltage, such as 0.8 V, is provided by the APS 520 as indicated at a block 606. In a next APS system boot step, the APS 520 reads controls signals from the power communication bus 522 as indicated at a block 608, and as indicated at a block 610 the APS 520 ramps from the first predetermined system voltage to the programmed system voltage indicated by the control signals determined by the hard-wired APS setting connections 510, 512.

Next a power re-supply step is performed as indicated at a block 612, and the system voltage level of the APS 520 is provided at the particular programmed voltage, as indicated at a block 614. Finally a chip boot step is performed as indicated at a block 616, and the system voltage level of the APS 520 is provided at the particular programmed voltage, as indicated at a block 618.

Figure 7:
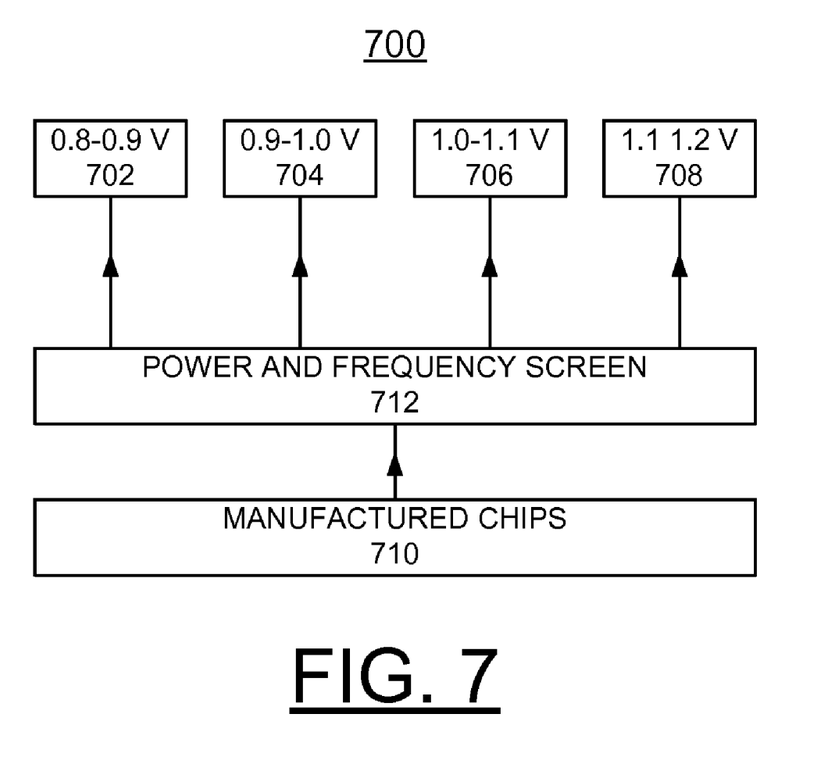
FIG. 7 is a block diagram illustrating exemplary chip sorting for manufactured chips enabled with the adaptive power supply (APS) of FIG. 5 in accordance with the preferred embodiment.

FIG. 7 illustrates chip sorting for manufactured chips enabled with the adaptive power supply (APS) system 500 in accordance with the preferred embodiment. The APS 520 provides multiple programmed voltage levels and manufactured chips are sorted into different voltage buckets as indicated at block 702, 704, 706, and 708. Chip testing of manufactured chips 710 is provided using a power and frequency screen 712 to determine a particular voltage buckets 702, 704, 706, and 708 for operating the chips. Then respective hard-wired APS setting connections 510, 512 for the respective sorted manufactured chips 710 are provided included with the secondary stacked chip circuit 501. Discarding fewer manufactured chips 710 is enabled with the APS system 500 since the chips are not required to function at the higher pre-boot voltages required for prior art eFuse sensing circuits.

Figure 8:
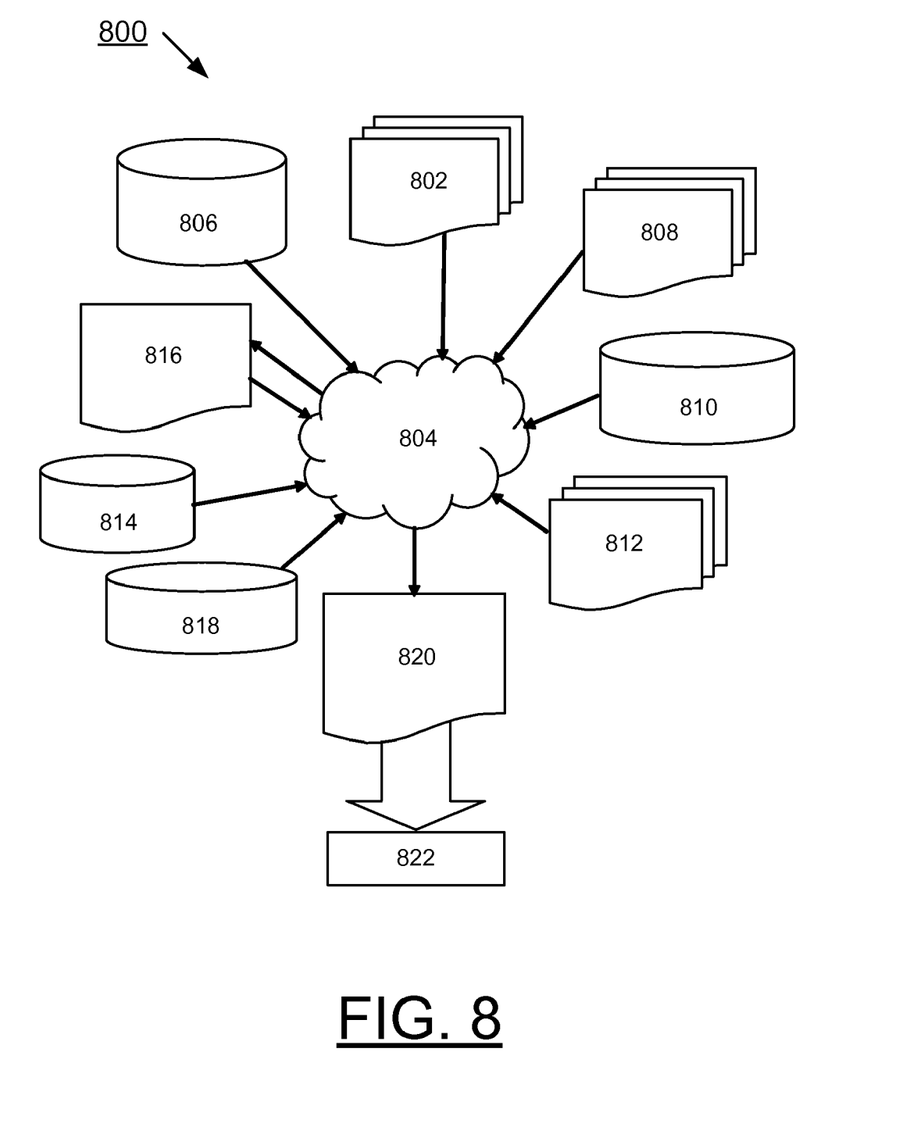
FIG. 8 is a flow diagram of a design process used in semiconductor design, manufacturing, and/or test.

FIG. 8 shows a block diagram of an example design flow 800. Design flow 800 may vary depending on the type of IC being designed. For example, a design flow 800 for building an application specific IC (ASIC) may differ from a design flow 800 for designing a standard component. Design structure 802 is preferably an input to a design process 804 and may come from an IP provider, a core developer, or other design company or may be generated by the operator of the design flow, or from other sources. Design structure 802 comprises circuit 500 in the form of schematics or HDL, a hardware-description language, for example, Verilog, VHDL, C, and the like. Design structure 802 may be contained on one or more machine readable medium. For example, design structure 802 may be a text file or a graphical representation of circuit 500. Design process 804 preferably synthesizes, or translates, circuit 500 into a netlist 806, where netlist 806 is, for example, a list of wires, transistors, logic gates, control circuits, I/O, models, etc. that describes the connections to other elements and circuits in an integrated circuit design and recorded on at least one of machine readable medium. This may be an iterative process in which netlist 806 is resynthesized one or more times depending on design specifications and parameters for the circuit.

Design process 804 may include using a variety of inputs; for example, inputs from library elements 808 which may house a set of commonly used elements, circuits, and devices, including models, layouts, and symbolic representations, for a given manufacturing technology, such as different technology nodes, 32 nm, 45 nm, 90 nm, and the like, design specifications 810, characterization data 812, verification data 814, design rules 816, and test data files 818, which may include test patterns and other testing information. Design process 804 may further include, for example, standard circuit design processes such as timing analysis, verification, design rule checking, place and route operations, and the like. One of ordinary skill in the art of integrated circuit design can appreciate the extent of possible electronic design automation tools and applications used in design process 804 without deviating from the scope and spirit of the invention. The design structure of the invention is not limited to any specific design flow.

Design process 804 preferably translates an embodiment of the invention as shown in FIGS. 5, 6A, 6B, and 7 along with any additional integrated circuit design or data (if applicable), into a second design structure 820. Design structure 820 resides on a storage medium in a data format used for the exchange of layout data of integrated circuits, for example, information stored in a GDSII (GDS2), GL1, OASIS, or any other suitable format for storing such design structures. Design structure 820 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 5, 6A, 6B, and 7. Design structure 820 may then proceed to a stage 822 where, for example, design structure 820 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A design structure embodied in a machine readable medium for designing, manufacturing, or testing a design, the design structure comprising:
   a primary chip including an adaptive power supply (APS);
   a secondary chip circuit including at least one pair of hard-wired APS setting connections; said APS providing a power supply to said secondary chip circuit; said at least one pair of hard-wired APS setting connections being coupled to said primary chip for implementing adaptive power supply (APS) system voltage level activation;
   each of said hard-wired APS setting connections being defined as a one value or a zero value by a selected connection to either a voltage supply connection or a ground potential connection; and
   a respective inverter coupling a respective control signal from each of said hard-wired APS setting connections to a power communication bus connected to said APS on said primary chip; and said APS providing a predetermined programmed system voltage level responsive to said respective control signals.

2. The design structure of claim 1, wherein the design structure comprises a netlist, which describes the circuit.

3. The design structure of claim 1, wherein the design structure resides on storage medium as a data format used for the exchange of layout data of integrated circuits.

4. The design structure of claim 1, wherein the design structure includes at least one of test data files, characterization data, verification data, or design specifications.

5. The design structure of claim 1, wherein said secondary chip circuit includes a stacked chip arrangement with said primary chip.

6. The design structure of claim 1, wherein said secondary chip is produced using relatively less expensive fabrication techniques as compared to said primary chip.

7. The design structure of claim 1, wherein said primary chip only receives control signals from said secondary chip for APS system voltage level activation, eliminating eFuses conventionally used for APS system voltage level activation, and eliminating the need for blowing and sensing the eFuses.

8. The design structure of claim 1, wherein said secondary chip provides control signals for APS system voltage level activation substantially immediately upon boot-up, eliminating a non-secure boot-up interval.

9. The design structure of claim 1, wherein an APS system boot-up includes an initial power ramp to a first predetermined system voltage, said first predetermined system voltage being less than a system voltage level required for said primary chip to function.

10. The design structure of claim 1, wherein said APS on said primary chip reads said control signal from each of said hard-wired APS setting connections, and activates a programmed system voltage level.

11. The design structure of claim 1, wherein said secondary chip circuit includes a stacked chip arrangement with said primary chip, and said power communication bus providing a physically secure bus extending between said stacked chip arrangement.

* * * * *